United States Patent [19]
Gimenez et al.

[11] Patent Number: 6,068,756
[45] Date of Patent: May 30, 2000

[54] PROCESS FOR THE REDUCTION OF CHLOROFLUOROCARBONS AND PRODUCTION OF DERIVATIVES THEREOF IN AN ELECTROLYTIC CELL, CELL FOR CARRYING OUT SAID REDUCTION AND PROCESS FOR REMOVING THE BY-PRODUCTS FORMED WITHIN THE CELL

[75] Inventors: Juan Casado Gimenez; Pere-Lluis Cabot Julia, both of Barcelona, Spain

[73] Assignee: Sociedad Espanola de Carburos Metalicos S.A., Barcelona, Spain

[21] Appl. No.: 08/913,389

[22] PCT Filed: Dec. 26, 1996

[86] PCT No.: PCT/ES96/00248

§ 371 Date: Nov. 4, 1997

§ 102(e) Date: Nov. 4, 1997

[87] PCT Pub. No.: WO97/24162

PCT Pub. Date: Apr. 10, 1997

[30] Foreign Application Priority Data

Dec. 28, 1995 [ES] Spain ................................. 9502533

[51] Int. Cl.⁷ .......................... C25B 3/00; C25B 3/06; C25B 3/08
[52] U.S. Cl. .................. 205/413; 205/459; 205/460; 205/462
[58] Field of Search .................. 205/413, 459, 205/460, 462

[56] References Cited

U.S. PATENT DOCUMENTS

| | | | |
|---|---|---|---|
| 3,703,557 | 11/1972 | Vecchio et al. | 260/653.3 |
| 4,007,099 | 2/1977 | Wu | 204/140 |
| 4,162,948 | 7/1979 | Yagii et al. | 204/80 |
| 4,968,393 | 11/1990 | Mazur et al. | 204/59 R |
| 5,198,095 | 3/1993 | Urakawa et al. | 205/138 |
| 5,520,793 | 5/1996 | Genders et al. | 205/464 |
| 5,616,221 | 4/1997 | Aoki et al. | 204/252 |

FOREIGN PATENT DOCUMENTS

| | | |
|---|---|---|
| 0294108 | 12/1988 | European Pat. Off. . |
| 294108 | 12/1988 | European Pat. Off. . |
| 2818065 | 5/1982 | Germany . |
| 3941813 | 6/1991 | Germany . |
| 852487 | 11/1969 | Italy . |
| 60-098550 | 5/1985 | Japan . |
| 2135669 | 9/1984 | United Kingdom . |
| 2204062 | 11/1988 | United Kingdom . |

OTHER PUBLICATIONS

Hasler et al., "A Novel Palladium–Silver Membrane Anode for Alkaline Fuel Cells Suitable for Carbon Dioxide–Containing Hydrogen", J. Power Sources, vol. 45, No. 1, pp. 93–103, 1993*.

*abstract only and no month available.
Abstract of EP 0 334796, Dappeheld, Steffen, "Manufacture of halogenated alkenes by electrolysis of halogenated alkanes", Mar. 1988, 1 page.
Chemistry Letters, pp. 1789–1792, 1988, Akira OKU, et al., "Chemical Decomposition of Chlorofluorocarbons by . . . ", No Month Available.
Matheson, Gas Data Book, 6$^{th}$ edition, 1980, pp. 670–683, No Month Available.
Kornienko, et al., translation from Elektrohimiya, vol. 28, No. 4, pp. 517–516, Apr. 1992.
Abstract of "Electroreduction of Freons, II", K. Smirnov, et al., Zh. Prikl. Khim., 1978, 51(3), pp. 701–702, No Month Available.
Abstract of "Heterogeneous hydrogenolysis of some fluorocarbons", S.D. Witt, et al., J. Catal. 1981, 71(2), pp. 270–277, No Month Available.
Copy of Quimica 2000, No. 46, 16 (1990), 1 page, No Month Available.
I.N. Levine, Fiscio–Quimica, Ed. McGraw–Hill, 1981, pp. 661–662, No Month Available.
Institute of Electrochemistry, vol. 12, 1970, pp. 1070–1071, No Month Available.
A. Savall, et al. "Reduction Electrochimique Du Trichloro–1, 1,2–Trifluoroethane: . . . ", Electrochimica Acta, vol. 35, No. 11/12, pp. 1727–1737, 1990, No Month Available.
M.J. Molina, et al., "Stratospheric sink for chlorofluoromethanes: . . . ", Nature, vol. 249, Jun. 28, 1979, pp. 810–812.

*Primary Examiner*—Kathryn Gorgos
*Assistant Examiner*—Edna Wong
*Attorney, Agent, or Firm*—Steinberg & Raskin, P.C.

[57] ABSTRACT

Process for the reduction of halogenated hydrocarbons and for obtaining their derivatives in an electrolytic cell which includes at least one cathode, at least one anode and a solution. A hydrogen-permeable membrane is arranged in the at least one anode such that the at least one anode constitutes a hydrogen-diffusion anode, and hydrogen or a hydrogen-containing gas is supplied to the hydrogen-permeable membrane. An electrolytic cell for the reduction of halogenated hydrocarbons includes at least one high overpotential cathode containing lead, cadmium, graphite, copper and/or tin, at least one hydrogen-diffusion anode containing palladium and a solution. Another process for the reduction of halogenated hydrocarbons and production of derivatives thereof entails dissolving the halogenated hydrocarbons in a solution, contacting the halogenated hydrocarbons in the solution with a high overpotential cathode and a hydrogen-diffusion anode including a hydrogen-permeable membrane, supplying hydrogen or a hydrogen-containing gas to the anode such that $H_2$ diffuses through the anode, oxidizing such $H_2$ at the anode to form $H^+$ ions and electrons and electrochemically reducing the halogenated hydrocarbons at the cathode.

19 Claims, No Drawings

PROCESS FOR THE REDUCTION OF CHLOROFLUOROCARBONS AND PRODUCTION OF DERIVATIVES THEREOF IN AN ELECTROLYTIC CELL, CELL FOR CARRYING OUT SAID REDUCTION AND PROCESS FOR REMOVING THE BY-PRODUCTS FORMED WITHIN THE CELL

This is a national stage application of PCT/ES96/00248, filed Dec. 26, 1996.

The present invention relates to a process for the reduction of chlorofluorocarbons and production of derivatives thereof in an electrolytic cell, and the electrolytic cell for carrying out said reduction.

The invention also relates to a process for removing the by-products formed within said electrolytic cell which are of no commercial interest or whose utilization is not required.

BACKGROUND OF THE INVENTION

The biological and environmental importance of the ozone layer in acting as a protective filter of UV solar radiation is known. According to James Andersen [I. N. Levine, Fisico-quimica, McGraw-Hill, Bogotá, 1981], if the amount of stratospheric ozone were to be reduced by only 10% the consequences would be extremely serious for plants and animals.

There have been shown to exist chemical species which destroy the ozone catalytically, such as chlorine atoms, hydrogen atoms, hydroxyl radicals, nitrogen monoxide and bromine atoms. In the case of chlorine atoms, and in the presence of sufficient free oxygen atoms, the decomposition takes place according to the following reactions:

$$Cl^- + O_3 \rightarrow ClO^- O_2$$

$$ClO^- + O \rightarrow Cl^- + O_2$$

In the presence of few free oxygen atoms, as is the case of the stratosphere over the Antarctic continent, the mechanism of decomposition is as follows:

$$2(Cl^- + O_3 \rightarrow ClO^- + O_2)$$

$$ClO^- + ClO^- \rightarrow Cl_2O_2$$

$$Cl_2O_2 + h\nu \rightarrow Cl^- + ClOO$$

$$ClOO \rightarrow Cl^- + O_2$$

The chlorofluorocarbons, CFCs or freons, especially those with long lives such as trichlorofluoromethane (CFC 10 11), dichlorodifluoromethane (CFC 12) and 1,1,2-trichloro-1,2,2-trifluorethane (CFC 113), are the ones mainly responsible for destruction of the stratospheric ozone layer [M. J. Molins & F. S. Rowland, Nature, 249 (1974) 810].

When these chlorofluorocarbons reach the stratosphere, and despite their stability under ordinary conditions, they undergo photolysis due to the action of UV radiation, with the consequent release of chlorine atomic radicals, which act as catalysts in breakdown of the ozone into oxygen in accordance with the above reactions.

The atoms of chlorine are not destroyed following the reaction, but recover and accumulate with any subsequent supply, thereby increasing their potential for destruction of the stratospheric ozone.

Moreover, the CFCs also contribute significantly to the greenhouse effect which threatens serious climatic change within only a few decades.

In 1977 the US government prohibited the use of CFCs as aerosol propellants. In 1987 the Montreal Protocol revealed the intention of most world governments to prohibit the production, distribution and emission into the atmosphere of CFCs [*The Montreal Protocol. A Briefing Book, Alliance for Responsible CFC Policy*, Rosslyn, Va., 1987].

Pursuant to that objective, intense research work has been carried out into obtaining substitutes for these compounds, and this has led, for example, to the compound known as HFC 134a ($CF_3$—$CH_2F$), which is non-chlorinated.

Furthermore, equipment has been developed for the recovery and recycling of CFCs, with good results [Primera Red de Reciclaje de los CFC, Quimica 2000, 46 (1990) 16]. Preventing the emission of CFCs into the atmosphere nevertheless calls for their destruction, given that their warehousing and recycling only postpones the problem and residual emissions nearly always exist. In any case, no solution has yet been found for the definitive destruction of these hazardous pollutants.

From the chemical point of view, the CFCs are capable of forming hydrogen acids by the action of water on steel receptacles, with consequent corrosion of same [MATHESON, *Gas Data Book*, 6th edition, 1980, pp. 671–683].

Processes based on the destruction of CFCs, such as high-temperature incineration, molecular breakdown by plasma, thermocatalytic destruction, photochemical reactions and supercritical water, are -too expensive and/or present technical or environmental problems.

Furthermore, many attempts have been made to destroy CFCs by chemical oxidation, but these have not brought acceptable results.

The destruction of CFCs by reduction has not been so widely studied. Attempts at reduction by hydrogen have been made on metallic catalysts supported in oxides or activated carbon [S. D. Witt et al., *Heterogeneous Hydrogenolysis of some Fluorocarbons, amongst other papers*].

Catalytic hydrogenation methods normally use noble metals, especially palladium, at high temperatures, and in 30 some cases achieve a significant percentage of the completely dechlorinated derivative. A. Oku et al., *Complete Destruction of CFCs by Reductive Dehalogenation using Sodium Naphtalenide, Chem. Lett.*, (1988) 1789 describes the complete dehalogenation of CFC 113 treated with sodium naphtalenide in tetrahydrofuran with tetraglime at 150° C.

Similar treatments were effective with CFC 12 and CFC 22. Reduction of CFC 12 with amalgamated metals in aprotic solvents gave tetrafluoroethylene [Belgian Patent 751481 (1969)]. That work showed that destruction of CFCs by reduction is a technically viable method, although a disadvantage lay in the use of reagents and/or solvents which were expensive for practical application on an industrial scale.

Studies carried out with carbon tetrachloride and freon 113 [A. P. Tomilov et al., *Electrochemistry of Organic Compounds*] show that injection of an electron from the cathode destabilizes the carbon-halogen bond and breaks it in the end, freeing a radical and the halide. The radicals can be hydrogenated, normally by capturing a new electron and protonizing or polymerizing. Using this process, cathodic dehalogenation of the carbon tetrachloride and of the CFC 113 itself has been achieved, electrocatalysed by the zinc. In the first case chloroform or methylene chloride was obtained, while in the second chlorotrifluoroethylene, an industrial monomer, was synthesized by partial dechlorination of said CFC in ethanol-water mixtures.

Indirect electrochemical reduction of 1,1,2-trichloro-1,2,2-trifluoroethane (CFC 113) [A. Savall, S. Dalbera, R. Abdelhedi and M. L. Bouguerra, *Electrochimia Acta*, 35, 11/12, 1727–1737 (1990)] was carried out in a water-alcohol medium (50–90% by volume of methanol) with $NH_4Cl$ 1M and CFC 113 saturate. The cathode used was of solid zinc, in contact with the solution. The final product obtained was the industrial monomer chlorotrifluoroethylene (CTFE).

For solutions of methanol of less than 70% by volume and weak saturation concentrations of CFC 113, the reaction was limited by the transfer of matter. Under these conditions at a constant overvoltage, the reduction current increased when the concentration of $NH_4Cl$ altered from 0.2 to 1 M.

For methanol-rich solutions (over 70% by volume) and strongly concentrated CFC 113 at saturation, the reduction reaction was limited by the transfer of charge.

For intermediate solutions of CFC 113, a sufficient increase of the $NH_4Cl$ concentration led to transition from a charge transfer reaction limitation to a matter transfer limitation.

The reduction of CFC 113 can arise directly by electrolysis on the Zn deposit, according to the following reaction:

$$Cl_2FC-CF_2Cl+2e^- \rightarrow ClFC=CF_2+2Cl^-$$

or by the chemical reaction of the Zn:

$$Cl_2FC-CF_2Cl+Zn \rightarrow ClFC=CF_2+ZnCl_2$$

The catalytic action of the $NH_4^+$ is not a direct consequence of its acid character. The action mechanism of this ion would appear to be:

$$2NH_4^+ + 2e^- \rightarrow 2NH_4^o$$

$$2NH_4^o + Cl_2FC-CF_2Cl \rightarrow ClFC=CF_2+2NH_4^+ +2Cl^-$$

This last reaction is particularly accelerated in the case of metals such as cadmium and zinc with high hydrogen overpressure.

One disadvantage of said process, however, is that the Zn electrodes are totally corroded, presenting major changes in their structure. This is due mainly to the chemical oxidation mechanisms, to the action of the CFC 113 and, finally, to the acidity of the $NH_4Cl$.

It is also important to point out that although the literature does contain descriptions of obtaining CTFE by electroreduction of the CFC 113 on Hg, Pb, Zn, Ni, Cu, Cd and Al cathodes and on hydrophobized porous cathodes using aqueous solutions of ammonium salts, detergents and metallic halides (whether or not in the presence of organic solvents such as methanol, ethanol, acetone or dioxane), in none of these electrochemical reductions of the CFC 113 did a greater degree of dechlorination take place than that pertaining to the CTFE, so that no compound such as TFE or halogenated compounds with fewer fluorine atoms was described.

The mechanism of the process for reduction of CFC 113 to produce CTFE appears to be quite similar to that of reduction of dichloro-tetrafluoro-ethane (CFC 114) to obtain tetrafluoroethylene on Hg cathodes [*Montecatini Edison S.p.a. Ital.* 852.487 (1969) and S. Dapperheld, EP 334.796 (1989)]. Tetrafluoroethylene can also be obtained by electrochemical reduction of dichlorodifluoromethane (CFC 112) on amalgamated Cu in solutions of $LiClO_4$ 0.5 mol $dm^{-3}$ (or tetramethylammonium trifluoroacetate) by using organic solvents (ethanol, acetonitryl or tetrahydrofuran) at a temperature of $-70°$ C. [N. S. Stepanova, M. M. Gol'din and L. G. Feoktistov, *Soviet. Electrochem.*, 12 (1976) 1070].

In this last case, tetrafluoroethylene is obtained together with chlorodifluoromethane, both in similar proportions. Also described is the obtaining of dichlorofluoromethane, chlorofluoromethane and fluoromethane by electroreduction of trichlorofluoromethane (CFC 11) and the obtaining of chlorofluoromethane and difluoromethane by electroreduction of CFC 12 on Hg cathodes in ethanol-water solutions [*Montecatini Edison S.p.a. Ital.* 852.487 (1969)].

Throughout the entire literature on electrochemical reduction of CFCs use is made of inert electrodes such as Pt, on which $Cl_2$ (from $Cl^-$) is given off, or else anodes which permit fixing of the $Cl^-$ formed by reduction of the CFC (such as Pb anodes).

Russian researchers have tackled the problem of the scant solubility of CFC 113 in water by reducing it on gas-diffusion cathodes made of carbon or copper and hydrophobic fluoropolymer [V. L. Kornienko, G. A. Kolyagin, G. V. Kornienko, Yu. V. Saltykov, *Electrokhimiyia*, 28, 507–16 (1992), amongst others]. In any case, the efficiency of partial dechlorination of the molecule does not exceed 30–50%.

Other papers and patents have been published on the electroreduction of CFC 113 [S. Dapperheld, EP 334.796 (1989); K. Yagii, H. Oshio, Ger. Offen 2.818.066 (1978); amongst others], but the processes implemented did not achieve complete dechlorination of the initial compounds.

SUMMARY OF THE INVENTION

The present invention manages to resolve the problems mentioned above, while at the same time providing other advantages which will be described below.

The present invention relates to a process for the reduction of chlorofluorocarbons (CFCs) and production of derivatives thereof in an electrolytic cell which includes at least one cathode, one anode and a solution, characterized in that the anode(s) are hydrogen-diffusion anodes.

It is notable that the process of the invention further permits, in addition to the reduction of chlorofluorocarbons by using hydrogen-diffusion anodes, the production of derivatives of same which had not been obtained to date by electrolysis using hydrogen-diffusion anodes.

The derivatives obtained according to the invention are hydrocarbons, hydrochlorofluorocarbons, hydrofluorocarbons and hydrogen acids.

The use of at least one hydrogen oxidation anode permits the electrolysis to be carried out in a single-compartment cell, without contaminating the solution with products of oxidation of the solvent or those deriving from reduction of the CFCs.

The hydrogen-diffusion anodes used in the invention have a lower oxidation potential, which substantially reduces the energy costs of the process. Moreover, the hydrogen obtained as a by-product of the cathodic process can be reused in an optimized industrial process designed for the purpose.

The invention relates to the electrolytic reduction of the carbon-halogen bonds in the presence of water, that is, in a protic medium. The solvent used in the invention must be difficult to reduce.

Preferably, the solution of the electrolytic cell consists in a solvent containing water, thereby achieving a dielectric constant sufficient to dissolve the electrolytes.

It is known in the art that the solubility of CFCs in water is very low (the most soluble is freon with a maximum concentration of 0.145%), for which reason the solvent preferably contains not only water but also another water-miscible organic solvent.

Taking account of the hydrolytic effect of water and the economic and environmental factors, mixtures of water and alcohol are preferred as solvent. Good solubility of CFC 11 and CFC 113 has been found in such mixtures.

Preferably, the used alcohol is methanol or ethanol, although tetrahyrofuran or propylene carbonate can be used as co-solvents.

The solution of the electrolytic cell can also include an electrolyte. The electrolytes can be compounds, such as hydroxides, lithium, sodium or ammonium chlorides or perchlorates, tetraalkyl perchlorate or the corresponding acids, the presence of the ammonium ion being particularly preferred for reduction of CFC 113.

In order to achieve suitable conductivity it is preferable to work with electrolyte concentrations close to saturation.

According to another characteristic of the invention, the addition of small quantities of salts of certain metals catalyses the reaction (II) described below and permits better yields in the totally dechlorinated product.

Preferably, said salts are palladium, zinc, cadmium or nickel chlorides, or silver or lead nitrates, with palladium chloride being the most effective of those used.

Advantageously, the electrolysis is carried out with the electrolytic cell isolated from the atmosphere. It is advisable to use a pressurized cell in order to force the products to remain in liquid phase, since the staggered reduction of the products in the electrolysis leads to increasingly volatile products.

Under these conditions, any possible atmospheric oxygen initially dissolved is reduced together with the CFC. However, its contribution is not significant. Furthermore, as the electrolysis advances the quantity of oxygen reduces, as it is exhausted by reduction.

The process of the invention can be carried out under standard pressure and temperature conditions, though it is preferable that the reduction of chlorofluorocarbons be carried out at temperatures between room temperature and −100° C., and at pressures between 1 bar and 100 bar.

The process of the invention therefore permits total dechlorination of the CFCs to be achieved by electroreduction, in aqueous media, with sufficient electrolysis time and at reasonable economic cost.

The invention also relates to an electrolytic cell for the reduction of chlorofluorocarbons which includes at least one cathode, one anode and a solution, and is characterized in that the anode or anodes are hydrogen-diffusion anodes.

Preferably, the anodes are hydrogen permeable membranes and containing metal palladium, a palladium-silver alloy, while they can include other components such as Pd/Ta.

The advantage conferred by hydrogen permeable metallic-membrane anodes is that they are stable in the water-alcohol medium used in the invention.

Said anodes constitute an innovation in themselves, in that the hydrogen-diffusion anodes which exist in the market are based on other materials.

One advantage of the use of metallic-membrane anodes lies in the fact that the anodes can be supplied with impure hydrogen and even with mixtures of gases containing hydrogen.

In electrolysis with a conventional anode the anodic reaction in association with the reductive process could be the evolution of oxygen and/or chlorine, that is, an undesirable reaction.

Thus, for example, using a conventional oxygen-evolution anode the overall reaction for the reduction of CFC 11 would be as follows:

$$CFCl_3 + 4H_2O \rightarrow CH_4 + 3HCl + HF + 2O_2 \quad (I)$$

Said reaction calls for the use of a twin-compartment cell in order to prevent anodic oxidation of the alcohol and/or the CFC derivatives.

Use of the hydrogen-diffusion anodes in the invention, on the other hand, gives rise to oxidation of the hydrogen to protons. The overall reaction in this case is:

$$CFCl_3 + 4H_2 \rightarrow CH_4 + 3HCl + HF \quad (II)$$

This reaction is the result of the sum of two semi-reactions, a cathodic reaction:

$$CFCl_3 + 8H^+ + 8e^- \rightarrow CH_4 + 3HCl + HF 2H^+ + 2e^- \rightarrow H_2$$

and an anodic reaction:

$$5H_2 \rightarrow 10H^+ + 10e^-$$

The hydrogen produced as a by-product on the cathode can be reused to supply the anode in the same process.

Carbon-TEFLON (TEFLON being a commercial name for polytetrafluoroethylene) anodes, such as those developed for fuel cells, can also be used, although they are not as stable in the water-alcohol medium used.

The Gibbs oxidation energy produced from oxidation of the methane to carbon dioxide, for example in a fuel cell, is of −818.05 kJ mol$^{-1}$. This value is in theory sufficient to compensate the energy consumed in carrying out the reaction (I), which Gibbs energy is of +464.90 kJ mol$^{-1}$. Reaction (II) is thermodynamically spontaneous, with Gibbs energy of −374.8 kJ mol$^{-1}$, so that it could work without supply of electrical energy in closed circuit if a hydrogen-diffusion anode were used.

The cathodes used in the invention have a high overpressure of hydrogen, thereby preventing excessive hydrogen release on them, which phenomenon would consume energy destined to reduction of the CFCs. Examples of this type of cathode are lead and cadmium cathodes. Graphite, copper and lead-tin alloy cathodes are also efficient.

Preferably, the cathodes used in the invention are lead and/or cadmium cathodes.

The gas resulting from the electrolysis is a valuable product, which can be used commercially. This is particularly exemplified in the case of CFC 113, whose reduction at atmospheric pressure produces chlorotrifluoroethylene, a monomer of industrial interest from which polymers can be obtained.

Furthermore, the role of the HFCs produced as refrigerants to replace the CFCs themselves, and the use of the other hydrocarbons as fuels, should not be forgotten. The resulting hydrogen fluoride is likewise an industrial gas with diverse applications, for example in the preparation of metal fluorides, fluorinated hydrocarbons and fluorine, together with catalysis in very diverse reactions. It is also used in the polishing and etching of glass.

It is also important to stress that the process of the invention for electrolytic reduction of chlorofluorocarbons permits CFC derivatives to be obtained by a method different from those used to date.

In the process for electrolytic reduction the following are produced as CFC derivatives: hydrocarbons, such as methane, ethane or ethylene hydrochlorofluorocarbons, hydrofluorocarbons such as 1,2-dichloro-1,1,2- trifluouroethane, chlorotrifluouroethlene, dichlorofluoromethane, chlorofluourormethane and hydrogen acids, such as trifluoroethylene, difluoroethylene, 1,2-dichloro-1,1,2-trifluoroethylene hydrochloric acid, flurohydic acid as derivatives of CFC 113, which had not been obtained to date by an electrolytic reduction process using hydrogen-diffusion anodes.

The present invention also provides a process for removing the derivatives formed, also termed by-products in that reference is made to a process for elimination of same, in the electrolytic cell, if it is not wished to collect them or reutilize them following suitable separation using conventional techniques, such as cryogenic distillation.

Said process includes the absorption of hydrogen acid, the incineration of hydrocarbons and the absorption of the products of incineration. The absorption of the hydrogen acids and the absorption of the products of incineration may be carried out by using a alkali.

The by-products of the electrolysis pass through a degasification step which is implemented between output from the cell and input to a gas washer where the hydrogen acids which are present will be absorbed. For example, the degasification step may be carried out at the output of the electrolytic cell.

The effluent gases are collected in the degassing chamber at a pressure slightly higher than atmospheric pressure. They are then transported to a first gas washer in order to absorb any hydrogen acids formed by the action of the water in the electrolysis (HCl and HF), using an alkali such as hydroxide of sodium, calcium or potassium. The hydrogen acids are easily trapped and separated from the hydrocarbons, since the latter are insoluble in said medium.

The resulting hydrocarbons and residual hydrogen are then taken to a burner. The burner can if necessary be supplied with oxygen-enriched air or pure oxygen. The quantity of hydrogen can be regulated in function of the electrical current consumed, so that if the fluorinated hydrocarbons are not very combustible it may be advisable to enrich the hydrogen content of the mixture.

The burnt gases then pass on to a second gas washer where the residual acids, $CO_2$ and any nitrogen oxides are absorbed using an alkaline medium.

The residual products must be analysed at the gas output to ensure the total destruction of any undesired by-product, which may later be recycled to the electrolytic cell.

The invention has the advantage of being sufficiently flexible to permit treatment of different CFCs and, foreseeably, mixtures of same.

Furthermore, the present invention may probably be applied in the destruction of other halogenated pollutants such as pesticides, haloaromatic derivatives and polychlorinated biphenyls (PCBs).

The process in itself is clean, given that all the products are gaseous and can therefore be separated easily from the electrolyte, which can later be reused. No toxic by-products such as dioxins, phosgene or carbon monoxide are produced, given that this is not an oxidative process.

Finally, we should not forget the usefulness which this solution might have in protection of the biosphere, given the global repercussions of the problem we are facing. Though not strictly scientific, technical or economic, this usefulness if of undoubted importance for the living beings which inhabit the planet, including human beings.

For a better understanding of all that has been set out above, several non-restrictive examples of embodiments of the invention are provided below.

DETAILED DESCRIPTION OF THE INVENTION

EXAMPLES

The embodiments of the examples show that CFC 11 and CFC 113 can be reduced in an electrolytic cell using Sn, Zn, Pb or Cu cathodes in water-alcohol solutions with 70–90% by volume of ethanol or methanol and common electrolytes such as $NH_4Cl$, $NH_4F$, NaCl, $NH_4Cl$—$NH_3$, $NH_4F$—$NH_3$ at moderate concentrations. Reduction of CFC 113 leads to the release of chloride into the working medium, both with solutions of $NH_4^+$ and regulator solutions of $NH_4^+NH_3$. There follow descriptions of some examples which illustrate the development of and improvements to the present invention. Initially, Pt anodes were used, while finally use was made of hydrogen-diffusion anodes based on palladium and a small quantity of palladium chloride as catalyst.

Example 1

In this example a glass cell was used with two electrodes, one of lead, acting as cathode, and another of platinum, acting as anode. The electrolyte consisted of 100 $cm^3$ of a water-alcohol solution with 80% methanol, to which ammonium chloride was added up to a concentration of 0.25 mol $dm^{-3}$. This solution was brought to a temperature of 0° C., which temperature was held constant through the example. Then 7.5 $cm^3$ of CFC 113 was added for each 100 $cm^3$ of water-alcohol solution, plus a slight excess amount to ensure saturation throughout the example.

The anode was a platinum wire 10 cm long coiled in spiral form, which was cleaned by heating in a Bunsen burner flame until red-hot immediately before the example. It should be pointed out that chlorine gas was given off on that anode during the electrolysis. The cathode consisted of a small strip of lead. The reduction products, or at least a major proportion of same, were given off in the form of gas: hydrogen, on the one hand, and the expected dechlorinated products, more volatile than freon, on the other. Given that gaseous products were given off at both electrodes, a 25 $cm^3$ graduated inverted tube was placed between them, provided with a septum for the subsequent analysis of gases. Said tubes were filled with the working solution, by aspiration, before starting the electrolysis.

The entire process was carried out in a closed cell with a volume of air in contact with the solution so as to permit possible changes of pressure due to the gaseous evolution on the electrodes.

A current density of 70 mA $cm^{-2}$ was applied for sufficient time to obtain a volume of gas of 24.6 $cm^3$ in the cathodic compartment. The charge used, measured in a current integrator, was 193 C. The gas collected was first analysed in a gas chromatograph connected to a mass spectrometer with electronic impact. The gases collected were 1,2-dichloro-1,1,2-trifluoroethylene, chlorotrifluoroethylene and trifluoroethylene, in addition to the vapours of CFC 113 and methanol. Considering the totality of the partially or totally dechlorinated products, the ionic percentage of compound with two atoms of chlorine was 5%, that of compound with one chlorine atom was 70% and that of completely dechlorinated product was 25%. No additional compound was detected. .

Secondly, the liquid sample was analyzed. For this purpose the same chromatograph was used and under the same working conditions. The liquid to be analysed was prepared by adding 1 $cm^3$ of chloroform to 10 $cm^3$ of the cell electrolyte, followed by triple-distilled water and filtering in a Millipore Milli-Q system, with which the organic products in the chloroform were extracted. The organic phase was put into a flask in the presence of anhydrous sodium sulphate in order to remove the residual water. The flask was then sealed and the samples were extracted. The result of the analysis was qualitatively the same as the analysis of the gas phase, the ionic percentage of the compound with two atoms of chlorine being 24%, that of compound with one chlorine atom being 54% and that of completely dechlorinated product being 22%. It should be noted that the percentage of the product with two chlorine atoms was higher in liquid phase due to the lower volatility of the liquid phase. Its greater presence in the liquid is advantageous in that this compound remains capable of losing atoms of chlorine afterwards by electrolysis.

Thirdly, the hydrogen content was analyzed in an HP 5890 gas chromatograph equipped with a thermal conductivity detector. The total hydrogen content of the gas collected on the cathode was put at 74%, which permitted calculation that the efficiency of current of the reduction reaction to give dechlorinated products was 30% (the dechlorinated products were also in the liquid phase).

Example 2

In this example the same cell was used as that described in Example 1. A platinum wire the same as used in Example 1 was used an anode. The differences with respect to Example 1 lay in the cathode and the electrolyte. A Cu wire coiled in spiral form was used as cathode, this being 7 cm long and having an operational surface area of 3.32 cm$^2$. The working solution consisted in a methanol-water solution at 80% methanol by volume to which ammonium salt was added up to a concentration of 0.25 mol dm$^{-3}$, together with 50 ppm of Pd$^{+2}$ (in the form of PdCl$_2$). To this solution was then added a volume of CFC 113 sufficient to ensure saturation throughout the example, which was also implemented at a temperature of 0° C.

The products obtained in gas phase after electrolysis at 64 mA cm$^{-2}$, in which 11.5 cm$^3$ of gas was collected in the cathodic compartment, were also the same as in Example 1: 1,2-dichloro-1,1,2-trifluoroethylene, chlorotrifluoroethylene and trifluoroethylene, in addition to hydrogen. The proportions were rather different, however. Reckoning only the partially or totally dechlorinated products, the ionic percentages of said products in the gaseous mixture were 5, 55 and 40%, respectively. The conditions of this Example 2 were therefore more favourable for obtaining the totally dechlorinated product than those of Example 1. The efficiency of the reaction for the formation of the dechlorinated products was lower than that of Example 1, at 8.5%, which result is consistent with the lower overpressure of hydrogen release at the cathode in this example.

Example 3

In this example an electrolytic cell was made with the idea of combining a cathode suitable for dechlorination of the CFC 113 with a hydrogen-diffusion anode which would permit use to be made of the hydrogen produced during the reduction. Whereas in Examples 1 and 2 it was shown to be possible to eliminate the chlorine completely from the molecules of CFC 113 by electrolysis on Pb and on Cu in the presence of a catalyst, this example used a combination with a hydrogen-diffusion anode. In this example a cathode of Pb was used in combination with an anode of Pd, the latter consisting of a thin strip of the pure (99.9%) metal. The strip of Pd had a thickness of 0.025 mm and was activated by electrodeposition of 4 mg cm$^{-2}$ of palladium-black based on a PdCl$_2$ solution. The anode and cathode were set at a distance of 2.5 cm apart. The area of the Pd membrane exposed to the solution was 0.5 cm$^2$, while that of the Pb cathode was 0.068 cm$^2$. The working solution consisted of a water-alcohol solution of methanol-water at 70% methanol by volume, to which was added NH$_4$Cl up to a concentration of 0.5 mol dm$^{-3}$ and PdCl$_2$ up to a concentration of 50 ppm of Pd$^{+2}$. After thermostatically controlling the system to a temperature of 20° C. the solution was saturated with CFC 113 and the inverted tubes were filled by aspiration. No compartmental separation was used between anolyte and catholyte. After application of a current density of 79.5 mA cm$^{-2}$ to the Pb cathode, the potential of the cell was 2.1 V, which value remained constant throughout the example. Following collection of 13 cm$^3$ of the gas given of f on the cathode, with a consumed charge of 120 C, this gas and the products present in the solution were analysed using the same method as for Example 1. The gas given off on the cathode contained, in addition to hydrogen and CFC 113 vapour, 1,2-dichloro-1,1,2-trifluoroethylene, chlorotrifluoroethylene, trifluoroethylene and traces of 1,1-difluoroethylene. Considering all the partially or totally dechlorinated products, the ionic percentage of 1,2-dichloro-1,1,2-trifluoroethylene in the mixture was 38.5%, that of chlorotrifluoroethylene was 33.5% and that of totally dechlorinated products was 28%.

The analysis of the working solution showed the presence of methanol, CFC 113, 1,2-dichloro-1,1,2-trifluoroethylene and chlorotrifluoroethylene. No other organic products were detected, which showed that the reaction on the hydrogen-diffusion anode consisted simply in oxidation of the H$_2$ gas to H$^+$. This result was also found in a parallel example using the same hydrogen-diffusion anode, the same initial working solution, a Pt cathode and a saturated calomel electrode as reference. The Pd electrode was subjected to a sweeping of anodic potentials firstly in the absence of hydrogen circulation and secondly with hydrogen circulation. Comparison of the two voltametric curves permitted the conclusion to be reached that up to current densities of 25 mA cm$^{-2}$ the hydrogen oxidation reaction took place with 100% efficiency (under the conditions of Example 3, 10.8 mA cm$^{-2}$ passed through this electrode).

The additional examples described below show how trifluoroethylene and difluoroethylene derivatives are obtained, as majority compounds, from electroreduction of CFC 113 on a lead cathode in ammonia water-alcohol solutions containing dissolved Pd$^{2+}$.

The electrolysis was carried out in a cell of 100 cm$^3$ capacity, combining said cathode with a hydrogen-diffusion anode. The hydrogen-diffusion anode was a fine strip of pure palladium (0.025 mm thickness) permeable to the hydrogen gas and activated by electrodeposition of 4 mg cm[]$^2$ of palladium-black based on a a solution of the metal chloride. The anode and cathode were set at a distance of 2.5 cm apart in an uncompartmentalized cell. The area of the Pd membrane exposed to the solution was 0.5 cm$^2$, while that of the Pb cathode was ten times lower. A 25 cm$^3$ graduated inverted tube was placed over the cathode, equipped with a septum for subsequent analysis of the gases given off.

The gases given off on the cathode were analysed using the gas chromatography technique with the equipment attached to a mass spectrometer using different columns. The gas was injected directly into the chromatograph, while the products present in the liquid were extracted by means of chloroform. The yield of the CFC 113 reduction reaction was determined by analysis of the hydrogen given off on the cathode. The composition of the products is expressed in ionic percentage of the partially or completely dechlorinated products, calculated on the basis of the number of ions measured by the mass spectrometer, which are directly proportional to the quantity of the compound in the corresponding phase. In the examples which follow, conditions are described in which the majority products are difluoroethylene, trifluoroethylene and 1,2-dichloro- 1,1,2-trifluoroethylene, with high yields, instead of chlorotrifluoroethylene, the only product described in the literature as a product of reduction of CFC 113 in conventional cells. No organic products deriving from oxidation of the methanol were detected, which indicates that the reaction on the hydrogen-diffusion anode consisted simply in oxidation of the $H_2$ gas to $H^+$.

Example 4

The working solution consisted of a water-alcohol solution of methanol-water at 70% methanol by volume, to which was added $NH_4Cl$ up to a concentration of 0.75 mol $dm^{-3}$ and $PdCl_2$ up to a concentration of 50 ppm of $Pd^{+2}$. After thermostatically controlling the system to a temperature of 20° C. the solution was saturated with CFC 113 and the inverted tube filled by aspiration.

After application of a current density of 80 mA $cm^{-2}$ to the Pb cathode for a time sufficient to give a charge circulation of 386 C, 9.5 $cm^3$ of gas were collected in which the presence of hydrogen was not detected. The efficiency of the CFC 113 reduction was at least 99%, according to a calculation of electrodeposition of a fine film of palladium-black on the lead and possible absorption of hydrogen in that film. The majority products of the reaction found in the gas phase were difluoroethylene and trifluoroethylene, accompanied by 1,2-dichloro-1,1,2-trifluoroethane and chlorotrifluoroethylene in addition to CFC 113 vapour and methanol. Considering the totality of the partially or totally dechlorinated products, the ionic percentage of difluoroethylene was 54%, that of trifluoroethylene was 25%, that of 1,2-dichloro-1,1,2-trifluoroethane was 8.5% and that of chlorotrifluoroethylene 9.5%. A higher proportion of the less volatile compounds was found in the liquid phase, they being distributed in the following ionic percentages: 36.5% difluoroethylene, 9.5% trifluoroethylene, 47.5% 1,2-dichloro-1,1,2-trifluoroethane and 2.9% chlorotrifluoroethylene. The remaining quantity up to 100%, both in the liquid and the gas, corresponded to small quantities of difluoroethane and fluoroethane.

Example 5

In this example use was made of the same cell, electrodes and composition of solution as used in Example 4. After passage of 348 C through the lead cathode at a current density of 200 mA $cm^{-2}$, 17 $cm^3$ of gas was collected. Taking into account the formation of a fine film of palladium electrodeposited on the cathode and possible absorption of hydrogen in that film, it was calculated that the efficiency of the CFC 113 reduction reaction was 98%. In the gas phase, apart from a small quantity of hydrogen and the vapours of the CFC 113 and of the methanol, the following products and ionic percentages (taking into account all partially and completely dechlorinated products) was found: 66% difluoroethylene, 8.5% trifluoroethylene, 10% 1,2-dichloro-1,1,2-trifluoroethane and 2.2% chlorotrifluoroethylene. In the liquid phase the ionic percentages were: 14.5% difluoroethylene, 1.5% trifluoroethylene, 70.5% 1,2-dichloro-1,1,2-trifluoroethane and 1.5% chlorotrifluoroethylene. The remaining quantity up to 100%, both in the liquid and the gas, corresponded to small quantities of difluoroethane and fluoroethane.

Example 6

In this example, the method of Example 5 was repeated, but at a charge of 130 C, with a gas volume of 3.5 $cm^3$ being collected in this case. In the gas phase the ionic percentages were: 60% difluoroethylene, 13% trifluoroethylene, 7% 1,2-dichloro-1,1,2-trifluoroethane and 5.5% chlorotrifluoroethylene. In the liquid phase the ionic percentages were: 19% difluoroethylene, 6.5% trifluoroethylene, 63% 1,2-dichloro-1,1,2-trifluoroethane and 3.5% chlorotrifluoroethylene. The remaining quantity up to 100%, both in the liquid and the gas, corresponded to small quantities of difluoroethane and fluoroethane.

The interest of this example lies in finding the effect of the presence of $Pd+^2$ in solution. Whereas in the presence of 50 ppm of the cation the results just outlined were obtained, the ionic percentages in gas phase in its absence were: 96% chlorotrifluoroethylene, 3.7% 1,2-dichloro-1,1,2-trifluoroethane and very small quantities of difluoroethylene and trifluoroethylene. In the liquid phase, the ionic percentages were: 79.4% chlorotrifluoroethylene, 20.4% 1,2-dichloro-1,1,2-trifluoroethane and also very small quantities of difluroethylene and trifluoroethylene. It is therefore clear that the cause of the inversion in the content of the chlorotrifluoroethylene and the totally dechlorinated products is to be found in the use of $Pd^{+2}$ in solution. It should be noted, moreover, that in the absence of $Pd^{+2}$ in the electrolyte the efficiency for CFC 113 reduction was only 49%.

It was found that this inversion was not due to the presence of the small film of palladium-black electrodeposited on the lead. In an electrolysis in which lead was used with palladium-black electrodeposited in a previous experiment and without $Pd^{+2}$ in solution, an efficiency of 45% was found for reduction of CFC 113 and compositions of the products in gas phase and liquid phase similar to those found in the example without $Pd^{+2}$ in solution. In this case, the following results were found in gas phase: 93.5% chlorotrifluoroethylene, 4.0% 1,2-dichloro-1,1,2-trifluoroethane. In the liquid phase the ionic percentages were: 81% chlorotrifluoroethylene and 16% 1,2-dichloro-1, 1,2-trifluoroethane. The remaining quantity up to 100%, both in the liquid and the gas, corresponded to small quantities of difluoroethylene and fluoroethylene.

Example 7

In this example the electrolysis process was carried out using the same electrodes and cell as in Example 4, though at a temperature of 15° C. The working solution was also a water-alcohol solution of methanol-water at 70% methanol by volume, to which was added $NH_4Cl$ up to a concentration of 0.75 mol $dm^{-3}$ and $PdCl_2$ up to a concentration of 50 ppm of $Pd^{+2}$. However, after thermostatically controlling the system to the temperature indicated, the solution was this time saturated with CFC 11. Electrolysis was then carried out at a current density of 80 mA $cm^{-2}$ for a time sufficient for circulation of a charge of 648 C. In the gas phase (19.5 $cm^3$) the following products of CFC 11 reduction were identified: dichlorofluoromethane, chlorofluoromethane and fluoromethane, with respective ionic percentages of 88.5, 10.4 and 1.1%. Dichlorofluoromethane and chlorofluoromethane were identified in the liquid, with respective ionic percentages of 97.2% and 2.8%.

We claim:

1. Process for the reduction of halogenated hydrocarbons and for obtaining their derivatives in an electrolytic cell which includes at least one cathode, at least one anode and a solution, comprising the steps of:

arranging the at least one anode such that it comprises a hydrogen-permeable membrane so that said at least one anode constitutes a hydrogen-diffusion anode, and supplying hydrogen or a hydrogen-containing gas to the hydrogen-permeable membrane.

2. Process as claimed in claim 1, wherein said halogenated hydrocarbons are chlorofluorocarbons.

3. Process as claimed in claim 1, wherein the derivatives are hydrocarbons selected from the group consisting of methane, ethane and ethylene, hydrochlorofluorocarbons selected from the group consisting of 1,2-dichloro-1,1,2-trifluoroethane, chlorotrifluoroethylene, dichlorofluoromethane and chlorofluoromethane, hydrofluorocarbons selected from the group consisting of fluoromethane, trifluoroethane, trifluoroethylene, difluoroethane and difluoroethylene, and hydrogen acids selected from the group consisting of hydrochloric acid and fluorohydric acid.

4. Process as claimed in claim 3, wherein said process further comprises absorption of hydrogen acids, the incineration of hydrocarbons and the absorption of the products of incineration.

5. Process as claimed in claim 4, wherein the absorption of hydrogen acids and the absorption of the products of incineration is carried out using an alkali.

6. Process as claimed in claim 5, wherein the alkali is a hydroxide of calcium, sodium or potassium.

7. Process as claimed in claim 4, wherein said process further comprises a degasification step at the output of the electrolytic cell.

8. Process as claimed in claim 1, wherein the solution comprises water.

9. Process as claimed in claim 1, wherein the solution comprises an alcohol.

10. Process as claimed in claim 9, wherein the alcohol is methanol or ethanol.

11. Process as claimed in claim 1, wherein the solution comprises an ammonium salt as an electrolyte.

12. Process as claimed in claim 1, wherein the solution comprises a catalyst.

13. Process as claimed in claim 12, wherein the catalyst is palladium chloride.

14. Process as claimed in claim 1, wherein said process is carried out isolated from the atmosphere.

15. Process as claimed in claim 1, wherein said process is carried out at temperatures between room temperature and −100° C.

16. Process as claimed in claim 1, wherein said process is carried out at pressures between 1 bar and 100 bar.

17. Process as claimed in claim 1, wherein said at least one anode comprises at least one of palladium, a palladium-silver alloy, palladium/tantalum and carbon-polytetrafluoroethylene.

18. Process as claimed in claim 1, wherein said at least one cathode is a high overpotential cathode comprising at least one of lead, cadmium, graphite, copper and tin.

19. A process for the reduction of halogenated hydrocarbons and production of derivatives thereof, said process comprising:

(a) dissolving said halogenated hydrocarbons in a solution;

(b) contacting said halogenated hydrocarbons in said solution with a high ovrerpotential cathode;

(c) contacting said halogenated hydrocarbons in said solution with a hydrogen-diffusion anode including a hydrogen-permeable membrane;

(d) supplying hydrogen or a hydrogen-containing gas to said anode such that $H_2$ diffuses through said anode;

(e) oxidizing said $H_2$ at said anode to form $H^+$ ions and electrons; and (f) electrochemically reducing said halogenated hydrocarbons at said cathode.

* * * * *